E. WHITE.
METAL REINFORCE FOR CONCRETE STRUCTURES.
APPLICATION FILED SEPT. 8, 1908.

917,822.

Patented Apr. 13, 1909.

WITNESSES
Frank E. Kaffman
Paul N. Frank

INVENTOR
Eli White.
BY
Dickerson, Brown, Raegener & Matty
ATTORNEYS

UNITED STATES PATENT OFFICE.

ELI WHITE, OF NEW YORK, N. Y.

METAL REINFORCE FOR CONCRETE STRUCTURES.

No. 917,822.  Specification of Letters Patent.  Patented April 13, 1909.

Application filed September 9, 1908. Serial No. 452,168.

*To all whom it may concern:*

Be it known that I, ELI WHITE, a citizen of the United States, residing at New York, in the county of New York and State of New York, have invented certain new and useful Metal Reinforces for Concrete Structures, of which the following is a specification.

My invention relates to a device for reinforcing concrete, which comprises a series of steel bars or metal members bound together at intervals by means of a plurality of clamps all of which are connected together to prevent the slipping of the clamps and to retain them in their correct positions on the series of steel bars or metal members, the ends of which are bent upward so as to act as shear bars when the reinforcement is embedded in concrete.

The objects of my invention are to provide a reinforcement for concrete which shall be efficient in resisting tensile and shearing stresses to which the same is subject.

Further objects of the invention are to construct a very economical reinforcement which may be shipped from one place to another, in a very compact form, the series of steel bars being so bound together that the ends may be bent upward just before the reinforcement is placed into position.

Figure 1:
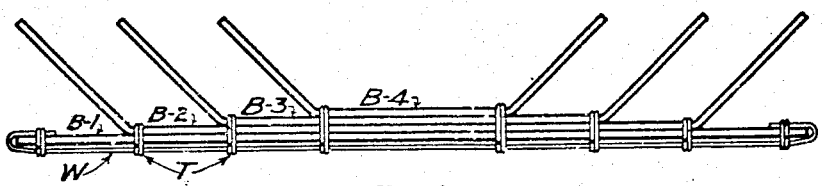
Figure 2:
Figure 3:
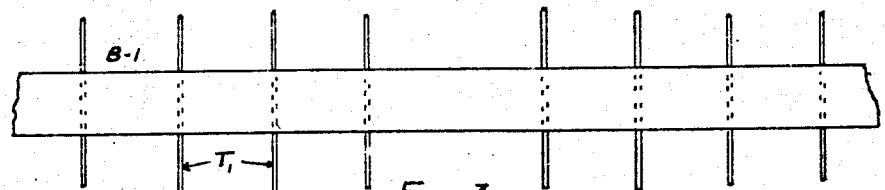
Figure 4:
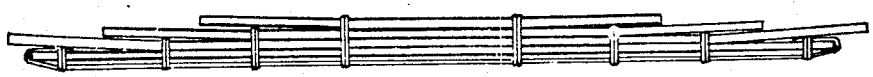

Referring to the drawings: Figure 1 is a side elevation of a reinforcement constructed in accordance with my invention. Fig. 2 is a plan view of the clamping member the clamps of which are broken away on their outer ends. Fig. 3 is a plan view of an alternate form of clamping member. Fig. 4 is a side elevation of a reinforcement ready for shipment.

In the drawings $B_1$, $B_2$, $B_3$ and $B_4$ designate steel bars or metal members which may be of any desired cross section, the same being preferably rectangular in shape and placed together with their broad faces adjacent to each other. These bars as shown in the figure are preferably of different lengths, the upper bar being in general shorter and thinner than the other bars which may be of varying lengths and thicknesses.

The bars as shown in the figures are secured together at intervals by means of clamps T which may be made of wires securely fastened around the bars as shown in Fig. 1. The clamps T are held rigidly in position by means of a longitudinal connecting member W which is welded to the clamp T as shown in Fig. 2 so as to prevent the clamps T from slipping lengthwise along the bar. The ends of the longitudinal member are preferably bent over the ends of the bar $B_1$ and secured thereto by means of clamps T as shown in Fig. 1.

It will be noticed that the clamps T are preferably situated at the point where the ends of the bars are bent upward, thereby marking the correct place at which the bars should be bent, so that the bars may be bound together at the factory as shown in Fig. 4 and when desired for use the ends can be bent upward in the correct position in a very simple manner, the longitudinal member W preventing the clamps T from slipping.

In Fig. 3 the clamping members $T_1$ are shown welded to the bottom bar $B_1$ but I prefer the construction shown in Fig. 1, as the same is less expensive.

Economy of reinforcement to resist the direct tensile stress in beams is secured by virtue of the fact that the lengths of the horizontal portions of the bars need be no greater than is required by the varying amounts of a bending moment. Efficiency of both tensile and shear reinforcement is secured by having the shear bars a direct continuation of the tensile reinforcement. The horizontal portions of the bars act as tensile reinforcement and the inclined extremities act as shear reinforcement.

While the invention has been described with particular reference to details of construction, it is not to be limited thereto, as many changes may be made and still fall within the scope of the appended claims.

What I do claim and desire to secure by Letters Patent is:

1. A metal reinforce for concrete structure, comprising a series of metal members of different lengths, clamps for securing said members together, said clamps being secured to said members near the ends thereof at points where it is intended the metal members should be bent upward, and a longitudinal connecting member welded to said clamps for holding the clamps in position.

2. A metal reinforce for concrete structures, comprising a series of metal members, clamps for securing said members together and a longitudinal connecting member welded to said clamps, the ends of said longitudinal connecting member being bent over the ends of one of said metal members.

3. A metal reinforce for concrete structures, comprising a series of metal members, clamps for securing said members together, a longitudinal connecting member welded to said clamps, the ends of said longitudinal connecting member being bent over the ends of one of said metal members and clamps for securing the bent ends of said longitudinal connecting member.

4. A metal reinforce for concrete structure, comprising a series of metal members of different lengths, wire clamps for securing said members together, said clamps being secured to said members near the ends thereof at points where it is intended the metal members should be bent upward, and a longitudinal connecting member welded to said clamps for holding the clamps in position.

5. A metal reinforce for concrete structure, comprising a series of metal members of different lengths, clamps for securing said members together, said clamps being secured to said members near the ends thereof at points where it is intended the metal members should be bent upward, and a longitudinal connecting member welded to said clamps, the ends of said longitudinal connecting member being secured to the ends of one of said metal members.

In testimony whereof I have signed this specification in the presence of two subscribing witnesses.

ELI WHITE.

Witnesses:
   FRANCES A. WHITE,
   ROSE WHITE.